United States Patent
Tsubata et al.

(10) Patent No.: US 8,330,328 B2
(45) Date of Patent: Dec. 11, 2012

(54) ULTRASONIC MOTOR

(75) Inventors: Toshiharu Tsubata, Tokyo (JP); Yoshihiro Ue, Hidaka (JP)

(73) Assignee: Olympus Corporation, Tokyo (JP)

( * ) Notice: Subject to any disclaimer, the term of this patent is extended or adjusted under 35 U.S.C. 154(b) by 309 days.

(21) Appl. No.: 12/850,686

(22) Filed: Aug. 5, 2010

(65) Prior Publication Data
US 2011/0043076 A1 Feb. 24, 2011

(30) Foreign Application Priority Data
Aug. 24, 2009 (JP) .................................. 2009-192678

(51) Int. Cl.
*H02N 2/00* (2006.01)
(52) U.S. Cl. .......... 310/323.09; 310/323.01; 310/323.16
(58) Field of Classification Search ............. 310/323.01, 310/323.02, 323.09, 323.16
See application file for complete search history.

(56) References Cited

U.S. PATENT DOCUMENTS
7,573,180 B2 * 8/2009 Funakubo ................ 310/316.01
2006/0061235 A1 3/2006 Funakubo FOREIGN PATENT DOCUMENTS
JP 2006-94591 A 4/2006
* cited by examiner

*Primary Examiner* — Thomas M Dougherty
(74) *Attorney, Agent, or Firm* — Holtz, Holtz, Goodman & Chick, PC

(57) ABSTRACT

An ultrasonic motor includes a vibrator, a mobile unit, a holding mechanism, and a pressing mechanism. The vibrator generates elliptical vibration by degenerating different vibration modes and having a phase difference between the different vibration modes. The mobile unit is configured to be movable relative to the vibrator. The holding mechanism holds and fixes the vibrator in a direction substantially parallel to the direction of the relative movement of the mobile unit. The pressing mechanism presses the vibrator against the mobile unit. The holding mechanism includes an adjustment unit for adjusting the resonant frequencies of the different vibration modes of the vibrator to substantially match each other when the ultrasonic motor is driven.

5 Claims, 10 Drawing Sheets

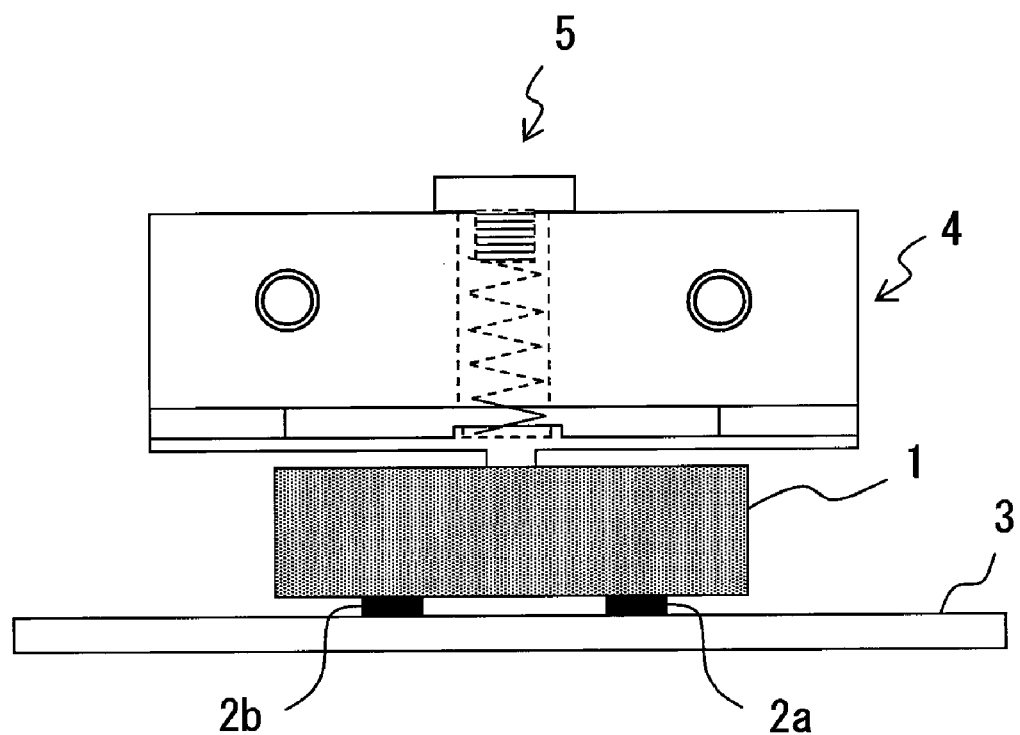
F I G. 1

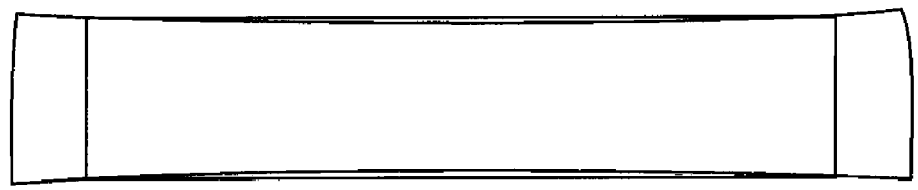
F I G. 2 A
F I G. 2 B

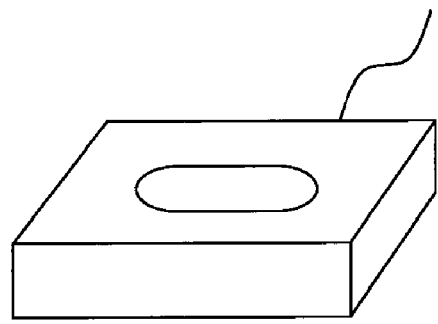
F I G. 4

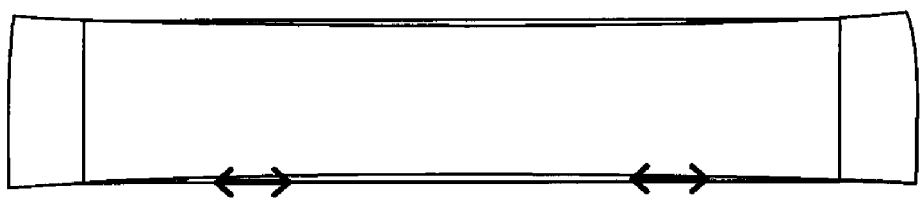
F I G. 5 A
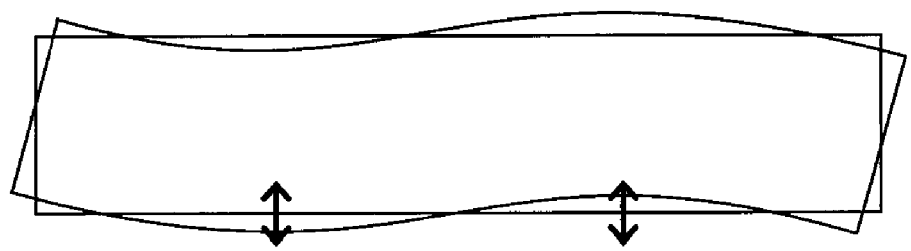
F I G. 5 B

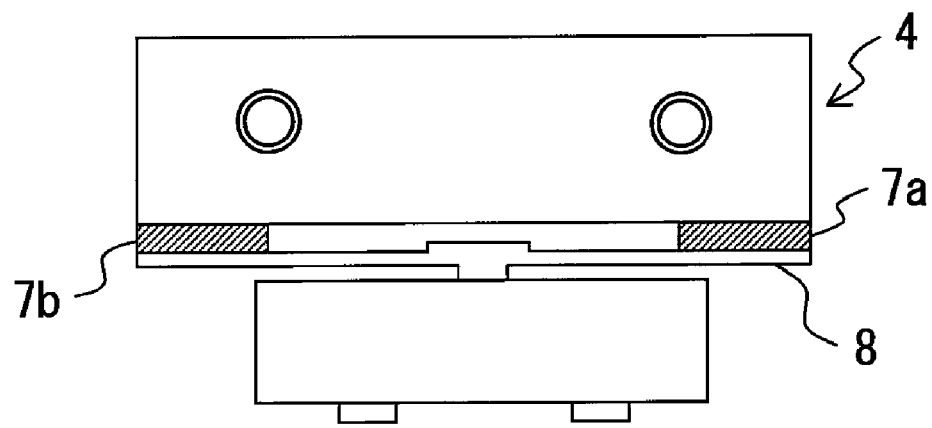
F I G. 7A
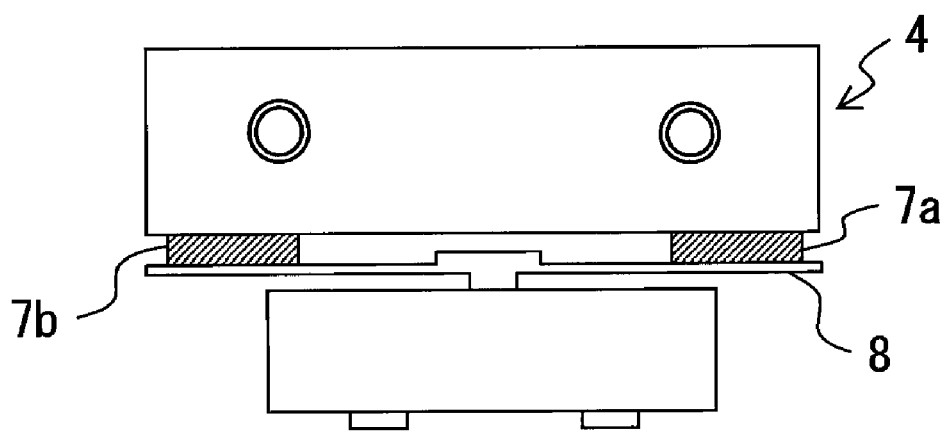
F I G. 7B

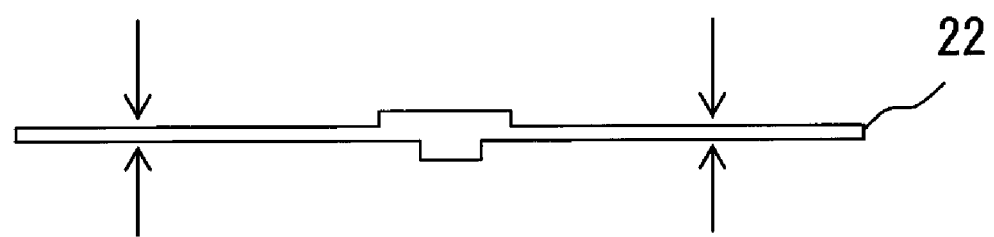
F I G. 9

| MATERIAL | YOUNG'S MODULUS |
|---|---|
| ALUMINUM | $7.03 \times 10^{10}$ |
| BRASS | $10.06 \times 10^{10}$ |
| SOFT IRON | $21.14 \times 10^{10}$ |
| CAST IRON | $15.23 \times 10^{10}$ |
| NICKEL | $19.95 \times 10^{10}$ |

FIG. 10

ULTRASONIC MOTOR

CROSS REFERENCE TO RELATED APPLICATIONS

This application is based upon and claims the benefit of priority from prior Japanese Patent Application No. 2009-192678, filed Aug. 24, 2009, the entire contents of which are incorporated herein by reference.

BACKGROUND OF THE INVENTION

1. Field of the Invention

The present invention relates to an ultrasonic motor.

2. Description of the Related Art

In configuring an ultrasonic motor for generating elliptical vibrations on a vibrator by having a phase difference in vibration mode between different vibration modes by degenerating the different vibration modes, it is necessary to have a device for degenerating the different vibration modes. The device can be the following method proposed by patent document 1 (Japanese Laid-open Patent Publication No. 2006-94591).

This method is to regard the increase in the resonant frequencies of the two different vibration modes "longitudinal vibration mode" and "flexional vibration mode" when pressure is applied to a vibrator, and the inclination of the increase of the resonant frequency of the flexional vibration mode as being higher than the inclination of the increase of the resonant frequency of the longitudinal vibration mode. That is, a difference in resonant frequency is to be maintained between the two vibration modes before the application of the pressure so that the resonant frequencies can substantially match each other when predetermined pressure is applied.

SUMMARY OF THE INVENTION

The ultrasonic motor according to an aspect of the present invention includes a vibrator, a mobile unit, a holding mechanism, and a pressing mechanism. The vibrator generates elliptical vibration by degenerating different vibration modes and having a phase difference between the different vibration modes. The mobile unit is configured to be removable relative to the vibrator. The holding mechanism holds and fixes the vibrator in a direction substantially parallel to the direction of the relative movement of the mobile unit. The pressing mechanism presses the vibrator against the mobile unit. The holding mechanism includes an adjustment unit for adjusting the resonant frequencies of the different vibration modes of the vibrator to substantially match each other when the ultrasonic motor is driven.

The ultrasonic motor according to another aspect of the present invention includes a vibrator, a mobile unit, a holding mechanism, and a pressing mechanism. The vibrator generates elliptical vibration by degenerating different vibration modes and having a phase difference between the different vibration modes. The mobile unit is configured to be movable relative to the vibrator. The holding mechanism holds and fixes the vibrator in the direction substantially parallel to the direction of the relative movement of the mobile unit. The pressing mechanism presses the vibrator against the mobile unit. The holding mechanism includes a thin sheet structure selected from among a plurality of thin sheet structures having different bending strengths depending on the resonant frequencies of the different vibration modes on the vibrator as a single unit.

BRIEF DESCRIPTION OF DRAWINGS

FIG. 1 is a top view of the ultrasonic motor according to embodiment 1 of the present invention;

FIG. 2A is a schematic diagram of the primary longitudinal vibration mode being generated on the vibrator;

FIG. 2B is a schematic diagram of the secondary flexional vibration mode being generated on the vibrator;

FIG. 4 is a perspective view of a spacer;

FIG. 5A is a schematic diagram of the vibration state when the primary longitudinal vibration mode is raised on the vibrator;

FIG. 5B is a schematic diagram of the vibration state when the secondary flexional vibration mode is raised on the vibrator;

FIG. 7A is a first view of an example of a change in position of the spacer;

FIG. 7B is a second view of an example of a change in position of the spacer;

FIG. 9 is a view of the fixing sheet member; and

FIG. 10 is a view of an example of a material having a different Young's modulus.

DESCRIPTION OF THE PREFERRED EMBODIMENT

The embodiments of the present invention are described below with reference to the attached drawings.

Embodiment 1

First, the configuration of the ultrasonic motor according to the embodiment 1 of the present invention is described with reference to FIGS. 1 through 4.

Figure 3:
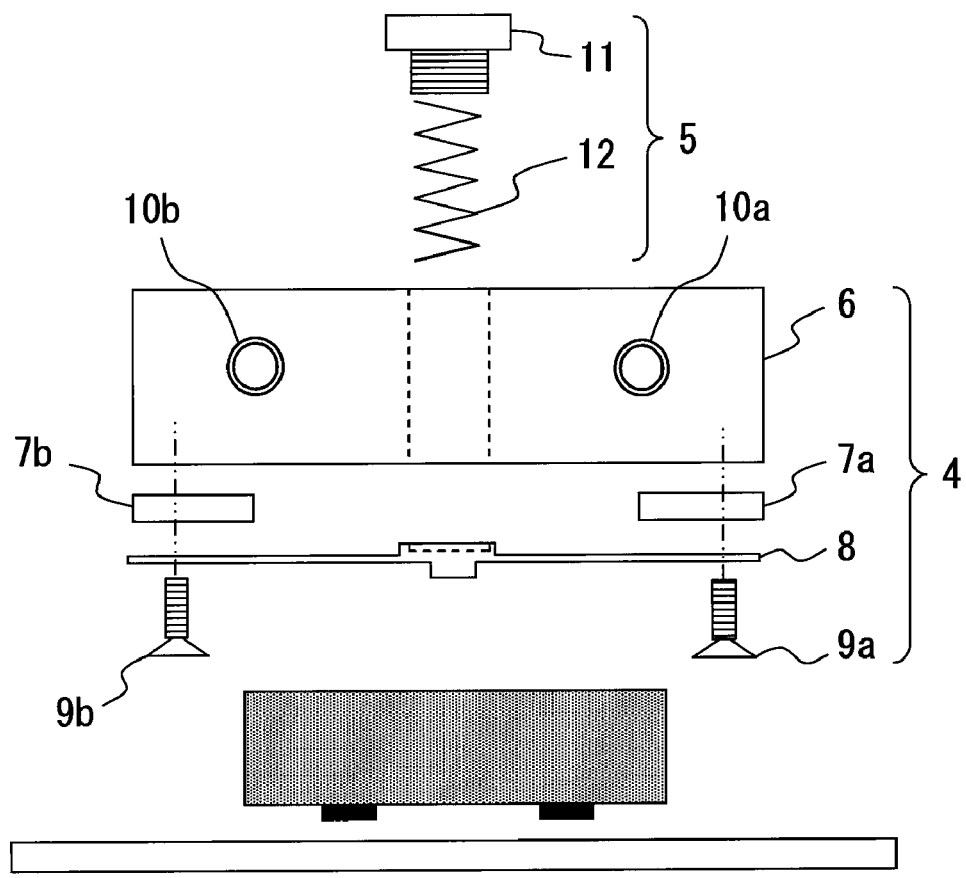
FIG. 3 is an exploded top view of the ultrasonic motor according to embodiment 1 of the present invention.

FIG. 1 is a top view of the ultrasonic motor according to the present embodiment of the invention, and partly includes a perspective plan. FIG. 2A is a schematic diagram of the primary longitudinal vibration mode raised on the vibrator included in the ultrasonic motor according to the present embodiment. FIG. 2B is a schematic diagram of the secondary flexional vibration mode raised on the vibrator included in the ultrasonic motor according to the present embodiment. FIG. 3 is an exploded top view of the ultrasonic motor according to the embodiment of the present invention. FIG. 4 is a perspective view of the spacer included in the ultrasonic motor according to the present embodiment.

In FIG. 1, a vibrator 1 is formed by an electromechanical conversion element of, for example, lead zirconate titanate (PZT), etc. The vibrator 1 is configured so that the primary longitudinal vibration mode illustrated in FIG. 2A and the secondary flexional vibration mode illustrated in FIG. 2B can be raised by externally applying a predetermined alternating voltage. Drivers 2a and 2b of an abrasion resistant member are adhered and fixed to the two portions at the belly of the vibration in the secondary flexional vibration mode of the vibrator 1. A holding mechanism 4 (the central portion of a fixing sheet member 8 described later in detail) is adhered and fixed at the central portion of the reverse side of the portion at which the drivers 2a and 2b are adhered and fixed on the vibrator 1. The holding mechanism 4 includes a pressing mechanism 5 for pressing the vibrator 1 against a mobile unit 3. The mobile unit 3 is configured to be movable relative to the vibrator 1, is supported as horizontally movable by, for example, a linear guide not illustrated in FIG. 1, and is pressed for contact against the two drivers 2a and 2b by the pressing mechanism 5.

The configurations of the holding mechanism 4 and 5 are described below in detail with reference to FIG. 3.

As illustrated in FIG. 3, in the holding mechanism 4, holder 6 and the fixing sheet member 8 are fixed by two fixing screws 9a and 9b through two spacers 7a and 7b. Thus, a predetermined space can be reserved between the holder 6 and the fixing sheet member 8. The fixing sheet member 8 is an example of a thin sheet structure included in the holding mechanism 4. The spacers 7a and 7b are provided with oval holes (or wide holes) through which the corresponding fixing screws 9a and 9b pass as illustrated in FIG. 4. Thus, the spacers 7a and 7b can be optionally shifted in the horizontal direction illustrated in FIG. 3 by the length of the major axis of the oval hole and can be fixed at the shifted position by the fixing screws 9a and 9b. When the holder 6 and the fixing sheet member 8 are fixed by the fixing screws 9a and 9b through the spacers 7a and 7b, an adhesive or the like which requires a curing time can additionally be used as long as the curing time causes no problems in the adjustment described later. The holder 6 is provided with fixing holes 10a and 10b, and is fixed by screws not illustrated in the attached drawings to a fixed object not illustrated in the attached drawings and not movable relative to the mobile unit although the mobile unit 3 moves in the horizontal direction illustrated in FIG. 3. Thus, the holding mechanism 4 can hold the vibrator 1 so that the vibrator 1 can be fixed in a direction substantially parallel to the direction of the relative movement of the mobile unit 3.

The pressing mechanism 5 includes a pressing screw 11 and a spring 12, and can press the central part of the fixing sheet member 8 by a predetermined pressure through the spring 12 inserted into the holder 6 by screwing the pressing screw 11 into the holder 6 including a nut. Thus, the vibrator 1 adhered and fixed to the central part of the fixing sheet member 8 can be pressed together with the drivers 2a and 2b by a predetermined pressure against the mobile unit 3.

Figure 6:
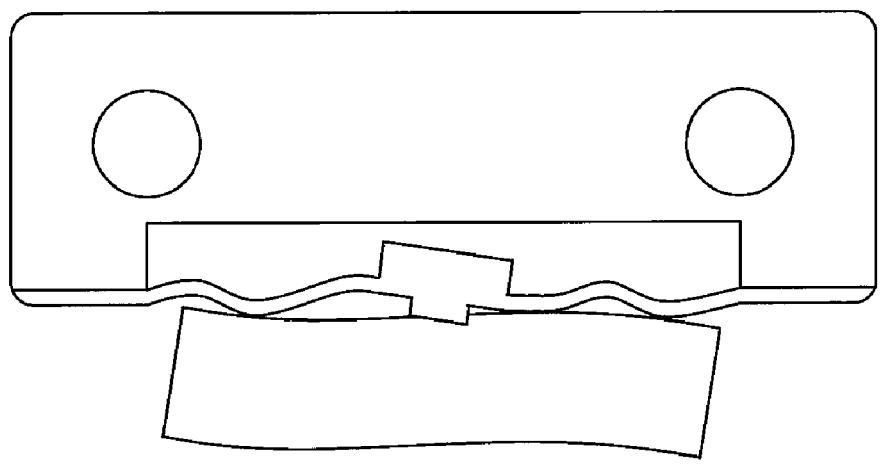
FIG. 6 is a schematic diagram of the vibration state of the fixing sheet member confirmed by measurement when the secondary flexional vibration mode is raised on the vibrator.

Next, the operation of the ultrasonic motor according to the present embodiment is described below with reference to FIGS. 5 through 7. FIG. 5A is a schematic diagram of the vibration state when the primary longitudinal vibration mode is raised on the vibrator 1. FIG. 5B is a schematic diagram of the vibration state when the secondary flexional vibration mode is raised on the vibrator 1. FIG. 6 is a schematic diagram of the vibration state of the fixing sheet member 8 confirmed by measurement when the secondary flexional vibration mode is raised on the vibrator 1. FIGS. 7A and 7B are examples of changing the positions of the spacers 7a and 7b.

With the ultrasonic motor according to the present embodiment, when the primary longitudinal vibration mode is raised by externally applying a predetermined alternating voltage, the portion where the drivers 2a and 2b are adhered and fixed on the vibrator 1 horizontally vibrates as illustrated by the two arrows in FIG. 5A. When the secondary flexional vibration mode is raised on the vibrator 1 by externally applying a predetermined alternating voltage, the portion where the drivers 2a and 2b are adhered and fixed on the vibrator 1 vertically vibrates as illustrated by the two arrows in FIG. 5B. If the primary longitudinal vibration mode and the secondary flexional vibration mode are simultaneously raised on the vibrator 1 with adjusted frequencies, and the phase difference of the vibration between the different vibration modes is adjusted substantially at 90°, then the locus of the vibration around the portion where the drivers 2a and 2b are adhered and fixed on the vibrator 1 refers to elliptical vibration. Thus, the vibrator 1 raises the elliptical vibration by degenerating different vibration modes and causing a phase difference on the vibration between the different vibration modes. When the mobile unit 3 is allowed to contact the drivers 2a and 2b adhered and fixed to the vibrator 1 which causes elliptical vibration, the mobile unit 3 moves, as is well known as the basic principle of the ultrasonic motor.

In this case, if the resonant frequencies of the primary longitudinal vibration mode and the secondary flexional vibration mode are made to match each other and the vibrator 1 vibrates around the resonant frequencies, then the above-mentioned elliptical vibration can acquire a vibration amplitude of a large diameter via the resonance. If the vibration amplitude is large, then the mobile unit 3 that contacts the drivers 2a and 2b adhered and fixed to the vibrator 1 which raises the elliptical vibration can also be efficiently moved. Thus, it is very important for an ultrasonic motor to allow the resonant frequencies of the primary longitudinal vibration mode and the secondary flexional vibration mode to match each other during the driving of the ultrasonic motor.

On the other hand, when the secondary flexional vibration mode is raised on the vibrator 1 with the holding mechanism 4 adhered and fixed to the vibrator 1, it is confirmed by measurement that the fixing sheet member 8 can be vibrated together as illustrated in FIG. 6. In this case, the resonant frequency of the secondary flexional vibration mode of the vibrator 1 changes for a higher frequency when the fixing sheet member 8 vibrates together with the vibrator 1 as compared with the case where the vibrator 1 vibrates singly. The amount of increase in the resonant frequency changes with the length of the vibration made when the fixing sheet member 8 makes wavy vibrations as illustrated in FIG. 6. It is confirmed by experiment that the amount of increase is small when the length is large, and the amount of increase is large when the length is small.

With the ultrasonic motor according to the present embodiment, when the ultrasonic motor is assembled, the effective length (also referred to as a valid length) of the portion of the vibration of the fixing sheet member 8 is changed by changing the positions of the spacers 7a and 7b as illustrated in FIGS. 7A and 7B. Thus, the resonant frequency of the secondary flexional vibration mode can be adjusted. However, the adjustment is made before installing the pressing mechanism 5. In the example illustrated in FIG. 7A, the spacers 7a and 7b are fixed at positions where the effective length of the vibrating portion of the fixing sheet member 8 can be larger so that the amount of increase in the resonant frequency of the secondary flexional vibration mode can be smaller. In the example illustrated in FIG. 7B, the spacers 7a and 7b are fixed at the positions where the effective length of the vibrating portion of the fixing sheet member 8 can be smaller so that the amount of increase in the resonant frequency of the secondary flexional vibration mode can be larger.

Thus, by changing the effective length of the vibrating portion of the fixing sheet member 8 by changing the positions of the spacers 7a and 7b while measuring the resonant frequency of the primary longitudinal vibration mode and the resonant frequency of the secondary flexional vibration mode, the difference between the resonant frequency of the primary longitudinal vibration mode and the resonant frequency of the secondary flexional vibration mode can be adjusted for an optional difference.

It is also confirmed by experiment that the resonant frequency of the secondary flexional vibration mode somewhat increases when the drivers 2a and 2b are pressed against the mobile unit 3. It is desired that the adjustment be made with the amount of increase taken into account.

Thus, according to the ultrasonic motor of the present embodiment, even though there occur variations in the resonant frequency of the primary longitudinal vibration mode and the resonant frequency of the secondary flexional vibration mode on the vibrator 1 for various reasons during production, an adjustment can be made to allow the resonant frequency of the primary longitudinal vibration mode and the resonant frequency of the secondary flexional vibration mode on the vibrator 1 when the ultrasonic motor is driven to substantially match each other by changing the positions of the spacers 7a and 7b when, for example, the ultrasonic motor is assembled. Therefore, the operation efficiency of the ultrasonic motor can be maximized, and the ultrasonic motor can be efficiently operated.

With the ultrasonic motor according to the present embodiment, the spacers 7a and 7b are examples of units capable of changing the effective length of the vibrating portion in the fixing sheet member 8. Also with the ultrasonic motor of the present embodiment, the spacers 7a and 7b are examples of adjustment units for allowing the resonant frequencies between different vibration modes on the vibrator 1 to substantially match each other when the ultrasonic motor is driven.

[Embodiment 2]

First, the configurations of the ultrasonic motor according to the embodiment 2 of the present invention are described below with reference to FIGS. 8 and 9.

Figure 8:
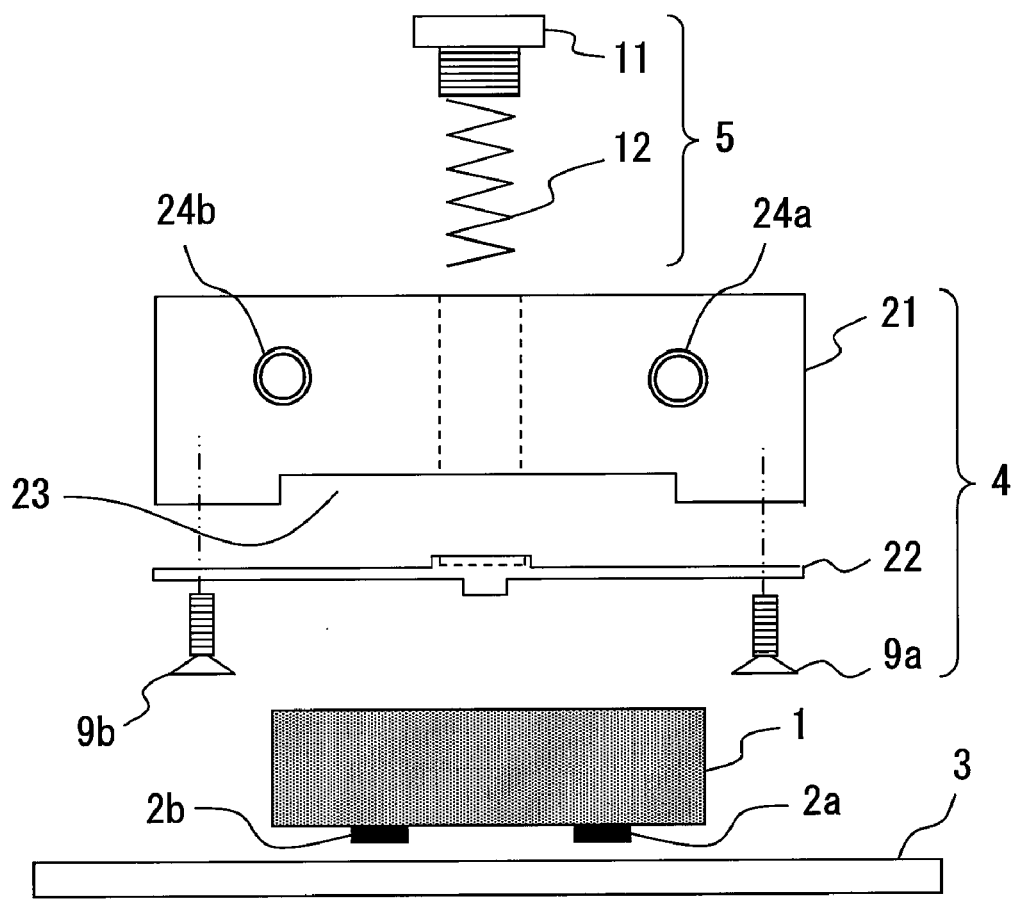
FIG. 8 is an exploded top view according to the embodiment 2 of the present invention.

FIG. 8 is an exploded top view according to the present embodiment of the invention. FIG. 8 corresponds to the exploded top view of the ultrasonic motor according to the embodiment 1 ultrasonic motor. FIG. 9 illustrates the fixing sheet member included in the ultrasonic motor according to the present embodiment.

The configuration of the ultrasonic motor according to the present embodiment is partly different from the configuration of the ultrasonic motor according to the embodiment 1. The different points are mainly described below.

As illustrated in FIG. 8, in the ultrasonic motor according to the present embodiment, a holder 21 is directly fixed to a fixing sheet member 22 by the two fixing screws 9a and 9b. When they are fixed, an adhesive etc. can also be used. The fixing sheet member 22 is an example of a thin sheet structure included in the holding mechanism 4. The holder 21 is provided with a notch portion 23 so that a predetermined space can be reserved between the holder 21 and the fixing sheet member 22 when the fixing sheet member 22 is fixed.

With the ultrasonic motor according to the present embodiment, a plurality of fixing sheet members 22 having different thicknesses in the portions illustrated by the arrows in FIG. 9 are prepared as the fixing sheet members 22 to be fixed to the holder 21. One of the members is selected and used. When the plurality of fixing sheet members 22 have different thicknesses in the portions illustrated by the arrows in FIG. 9, the bending strength is variable. In each of the plurality of fixing sheet members 22, the thicknesses of the two portions indicated by the arrows in FIG. 9 are the same.

Like the holder 6 illustrated in FIG. 3, the holder 21 is provided with fixing holes 24a and 24b, and is fixed by screws not illustrated in the attached drawings to a fixed object not illustrated in the attached drawings and not movable relative to the mobile unit 3 even though the mobile unit 3 moves in the horizontal direction illustrated in FIG. 8.

Other configurations are the same as those of the ultrasonic motor according to embodiment 1

Described next is the operation of the ultrasonic motor according to the present embodiment.

The operation of the ultrasonic motor according to the present embodiment is partially different from the operation of the ultrasonic motor according to embodiment 1. Therefore, the different portions are mainly described below.

With the ultrasonic motor according to the present embodiment, when the secondary flexional vibration mode is raised on the vibrator 1 with the holding mechanism 4 adhered and fixed to the vibrator 1, it is confirmed by measurement that the fixing sheet member 22 can be vibrated together as illustrated in FIG. 6. In this case, the resonant frequency of the secondary flexional vibration mode of the vibrator 1 changes for a higher frequency when the fixing sheet member 22 vibrates together with the vibrator 1 as compared with the case where the vibrator 1 vibrates singly. The amount of increase in the resonant frequency changes with the thickness of portions the vibration is caused when the fixing sheet member 22 causes wavy vibrations as illustrated in FIG. 6. It is confirmed by experiment that the amount of increase is small when the thickness is small and the amount of increase is large when the thickness is large.

With the ultrasonic motor according to the present embodiment, when the ultrasonic motor is assembled, the resonant frequency of the primary longitudinal vibration mode and the resonant frequency of the secondary flexional vibration mode are measured in advance on the vibrator 1 as a single unit, and the fixing sheet member 22 is selected depending on the difference in thickness. Then, the selected fixing sheet member 22 is adhered and fixed to the vibrator 1, and is fixed to the holder 21 by the two fixing screws 9a and 9b.

As with embodiment 1 above, it is confirmed by experiment that the resonant frequency of the secondary flexional vibration mode somewhat increases when the drivers 2a and 2b are pressed against the mobile unit 3. Thus, when the fixing sheet member 22 to be used is selected, it is preferable to select a fixing sheet member 22 having a thickness corresponding to the amount of increase.

Other operations are the same as those of the ultrasonic motor according to embodiment 1.

As described above, according to the ultrasonic motor of the present embodiment, although there occur variations between the resonant frequency of the primary longitudinal vibration mode and the resonant frequency of the secondary flexional vibration mode for various reasons during production, the fixing sheet member 22 having an appropriate thickness can be selected and used when the ultrasonic motor is assembled, thereby enabling the resonant frequency of the primary longitudinal vibration mode and the resonant frequency of the secondary flexional vibration mode to substantially match each other when the ultrasonic motor is driven. Thus, the operation efficiency of the ultrasonic motor can be maximized, and the ultrasonic motor can be efficiently operated.

Embodiment 3

The configuration of the ultrasonic motor according to embodiment 3 of the present invention is partly different from the configuration of the ultrasonic motor according to embodiment 2. The different portions are mainly described below.

With the ultrasonic motor according to embodiment 2 above, a plurality of fixing sheet members 22 having different thicknesses in the portions illustrated by the arrows in FIG. 9 are prepared as the fixing sheet members 22 to be fixed to the holder 21. One of the members is selected and used.

On the other hand, in the ultrasonic motor according to the present embodiment, a plurality of fixing sheet members 22 of different materials are prepared as the fixing sheet members 22 to be fixed to the holder 21, and one of the selected members is used. In the present embodiment, a different material refers to having a different Young's modulus (or a coefficient of elasticity), and having a different bending strength.

Other configurations are the same as the configurations of the ultrasonic motor according to embodiment 2.

Described next is the operation of the ultrasonic motor according to the present embodiment.

The operation of the ultrasonic motor according to the present embodiment is partially different from the operation of the ultrasonic motor according to embodiment 2. The different portions are mainly described below.

With the ultrasonic motor according to the present embodiment, when the secondary flexional vibration mode is raised on the vibrator 1 with the holding mechanism 4 adhered and fixed to the vibrator 1, it is confirmed by measurement that the fixing sheet member 22 can be vibrated together as illustrated in FIG. 6. In this case, the resonant frequency of the secondary flexional vibration mode of the vibrator 1 changes for a higher frequency when the fixing sheet member 22 vibrates together with the vibrator 1 as compared with the case where the vibrator 1 vibrates singly. The amount of increase in the resonant frequency changes with the Young's modulus of portions the vibration is caused when the fixing sheet member 22 makes wavy vibrations as illustrated in FIG. 6. It is confirmed by experiment that the amount of increase is small when the Young's modulus is small, and the amount of increase is large when the Young's modulus is large.

With the ultrasonic motor according to the present embodiment, for example, when the ultrasonic motor is assembled, the resonant frequency of the primary longitudinal vibration mode and the resonant frequency of the secondary flexional vibration mode are measured in advance on the vibrator 1 as a single unit, and the fixing sheet member 22 is selected depending on the difference in Young's modulus. Then, the selected fixing sheet member 22 is adhered and fixed to the vibrator 1, and fixed to the holder 21 by the two fixing screws 9a and 9b.

As with embodiment 1 above, it is confirmed by experiment that the resonant frequency of the secondary flexional vibration mode somewhat increases when drivers 2a and 2b are pressed against the mobile unit 3. Thus, when the fixing sheet member 22 to be used is selected, it is preferable to select a fixing sheet member 22 having a corresponding Young's modulus with the amount of increase taken into account.

An example of a substance having a different Young's modulus is illustrated in FIG. 10. In addition to the substances other than those illustrated in FIG. 10 and alloys of them, the fixing sheet members 22 of various values of Young's modulus can be prepared, and the fixing sheet member 22 of a more appropriate Young's modulus can be selected and used.

Other operations are the same as the operations of the ultrasonic motor according to embodiment 2.

As described above, with the ultrasonic motor according to the present embodiment, although there occurs a variation between the resonant frequency of the primary longitudinal vibration mode and the resonant frequency of the secondary flexional vibration mode on the vibrator 1 for various reasons during production, it is possible to allow the resonant frequency of the primary longitudinal vibration mode and the resonant frequency of the secondary flexional vibration mode to substantially match each other on the vibrator 1 when the ultrasonic motor is driven by selecting and using the fixing sheet member 22 of an appropriate material (Young's modulus). Therefore, the operation efficiency of the ultrasonic motor can be maximized, thereby efficiently operating the ultrasonic motor.

The ultrasonic motors according to embodiments 1 through 3 are described above, but it is obvious that the present invention can also be configured by combining two or more of the embodiments to allow the resonant frequency of the primary longitudinal vibration mode and the resonant frequency of the secondary flexional vibration mode to substantially match on the vibrator 1 when the ultrasonic motor is driven. For example, a plurality of fixing sheet members 22 having different thicknesses (thicknesses of the portions indicated by the arrows in FIG. 9) and materials (Young's modulus) are prepared as the fixing sheet member 22 fixed to the holder 21, and one of the members can be selected and used.

As described above, the present invention has been described in detail, but the present invention is not limited to the above-mentioned embodiments, and it is obvious that various improvements and modifications can be performed within the scope of the gist of the present invention.

According to the present invention, the resonant frequencies of different vibration modes can be allowed to substantially match each other on a vibrator via adjustment when an ultrasonic motor is driven even if there occurs a variation in resonant frequency of difference vibration modes on the vibrator for various reasons in production.

What is claimed is:

1. An ultrasonic motor, comprising:
   a vibrator generating elliptical vibration by degenerating different vibration modes and having a phase difference between the different vibration modes;
   a mobile unit configured to be movable relative to the vibrator;
   a holding mechanism holding and fixing the vibrator in a direction substantially parallel to a direction of the relative movement of the mobile unit; and
   a pressing mechanism pressing the vibrator against the mobile unit, wherein
   the holding mechanism comprises adjustment units for adjusting resonant frequencies of different vibration modes of the vibrator to substantially match each other when the ultrasonic motor is driven.

2. The ultrasonic motor according to claim 1, wherein:
   the holding mechanism comprises a thin sheet structure; and
   the adjustment units can change an effective length of a vibration raised in the thin sheet structure.

3. The ultrasonic motor according to claim 2, wherein the adjustment units are spacers provided with oval holes.

4. An ultrasonic motor, comprising:
   a vibrator generating elliptical vibration by degenerating different vibration modes and having a phase difference between the different vibration modes;
   a mobile unit configured to be movable to the vibrator;
   a holding mechanism holding and fixing the vibrator in a direction substantially parallel to a direction of the relative movement of the mobile unit; and
   a pressing mechanism pressing the vibrator against the mobile unit, wherein:
   the holding mechanism comprises a thin sheet structure; and
   the thin sheet structure is selected from among a plurality of thin sheet structures having different bending strengths depending on resonant frequencies of the different vibration modes on the vibrator as a single unit.

5. The ultrasonic motor according to claim 4, wherein the bending strength depends on a material or a thickness of the thin sheet structure.

* * * * *